(12) United States Patent
Krasnowski et al.

(10) Patent No.: US 10,792,896 B2
(45) Date of Patent: Oct. 6, 2020

(54) METHOD FOR LIMITING INTERLAMINAR FATIGUE IN COMPOSITE LAMINATE AND A COMPONENT INCORPORATING THE SAME

(71) Applicant: Bell Helicopter Textron Inc., Fort Worth, TX (US)

(72) Inventors: Bogdan Roman Krasnowski, Bedford, TX (US); Robert Arnold Brack, Bedford, TX (US); Xiaoming Li, Colleyville, TX (US); Robert Wardlaw, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 650 days.

(21) Appl. No.: 14/798,658

(22) Filed: Jul. 14, 2015

(65) Prior Publication Data

US 2016/0082696 A1    Mar. 24, 2016

Related U.S. Application Data

(60) Provisional application No. 62/024,213, filed on Jul. 14, 2014, provisional application No. 62/189,053, filed on Jul. 6, 2015.

(51) Int. Cl.
*B32B 7/02* (2019.01)
*B32B 27/08* (2006.01)
(Continued)

(52) U.S. Cl.
CPC .............. *B32B 27/08* (2013.01); *B29C 70/06* (2013.01); *B29C 70/30* (2013.01); *B32B 5/142* (2013.01); *B32B 27/38* (2013.01); *B32B 37/144* (2013.01); *B29L 2031/3088* (2013.01); *B32B 2262/0269* (2013.01); *B32B 2262/101* (2013.01); *B32B 2262/106* (2013.01); *B32B 2305/72* (2013.01);
(Continued)

(58) Field of Classification Search
CPC ........... B32B 7/02; B32B 27/38; B32B 37/14; B32B 27/08
USPC ....................................................... 428/212
See application file for complete search history.

(56) References Cited

U.S. PATENT DOCUMENTS 4,197,360 A     4/1980  Throop
4,293,276 A *  10/1981  Brogdon ................. B64C 27/33
                                                        416/134 A
(Continued)

FOREIGN PATENT DOCUMENTS

JP          04292909 A  * 10/1992

OTHER PUBLICATIONS

English_Translation_JP_04292909_A; Prepreg; Hattori, T.; Oct. 16, 1992; JPO; whole document.*

*Primary Examiner* — Tahseen Khan
(74) *Attorney, Agent, or Firm* — Timmer Law Group, PLLC

(57) ABSTRACT

In some embodiments, a rotor system for a rotorcraft includes a yoke, a blade, and a grip that is configured to couple the blade to the yoke. The grip has a plurality of baseline layers and a compliant layer. The baseline layers each have a plurality of fibers disposed in a first polymeric matrix. The compliant layer has a plurality of fibers disposed in a second polymeric matrix. The compliant layer is stronger than the baseline layer and the first polymeric matrix has a different chemical composition than the second polymeric matrix.

13 Claims, 9 Drawing Sheets

(51) Int. Cl.
  *B32B 37/14* (2006.01)
  *B32B 27/38* (2006.01)
  *B29C 70/06* (2006.01)
  *B29C 70/30* (2006.01)
  *B32B 5/14* (2006.01)
  *B29L 31/30* (2006.01)

(52) U.S. Cl.
  CPC ..... *B32B 2307/552* (2013.01); *B32B 2605/18* (2013.01)

(56) References Cited

U.S. PATENT DOCUMENTS

| | | |
|---|---|---|
| 9,073,625 B1 | 7/2015 | Ingram et al. |
| 2004/0130072 A1* | 7/2004 | Sekido ................. B29C 70/443 264/408 |
| 2007/0293603 A1* | 12/2007 | Shepherd ............... C08G 59/44 523/467 |
| 2008/0210212 A1* | 9/2008 | Baratta ................ B23D 61/026 125/15 |
| 2011/0229336 A1* | 9/2011 | Richter ................ B29C 65/505 416/226 |
| 2012/0201683 A1* | 8/2012 | Stamps ................... B64C 27/32 416/204 R |
| 2012/0226017 A1* | 9/2012 | Pfeffinger ............... C08L 63/00 528/405 |
| 2014/0271209 A1 | 9/2014 | Wardlaw et al. |
| 2015/0064013 A1* | 3/2015 | Measom ............... B29C 70/342 416/226 |
| 2015/0284599 A1* | 10/2015 | Kerep ...................... C09J 7/255 156/157 |
| 2017/0292050 A1* | 10/2017 | Burckhardt ............ C09J 163/00 |
| 2019/0300758 A1* | 10/2019 | Kawazoe ............... C09J 133/00 |
| 2019/0316010 A1* | 10/2019 | Kawazoe ............... B32B 27/00 |

* cited by examiner

METHOD FOR LIMITING INTERLAMINAR FATIGUE IN COMPOSITE LAMINATE AND A COMPONENT INCORPORATING THE SAME

BACKGROUND

Technical Field

This present disclosure relates generally to composite laminates.

Description of Related Art

Typically, composite laminate is manufactured from the same fibrous material and the same polymeric-matrix material, throughout. The structure may have a risk of delamination and/or producing matrix cracks, especially when subjected to high cycle dynamic loading. Hence, there is a need for an improved composite laminate

DESCRIPTION OF THE DRAWINGS

The novel features believed characteristic of the apparatus and method of the present disclosure are set forth in the appended claims. However, the apparatus and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
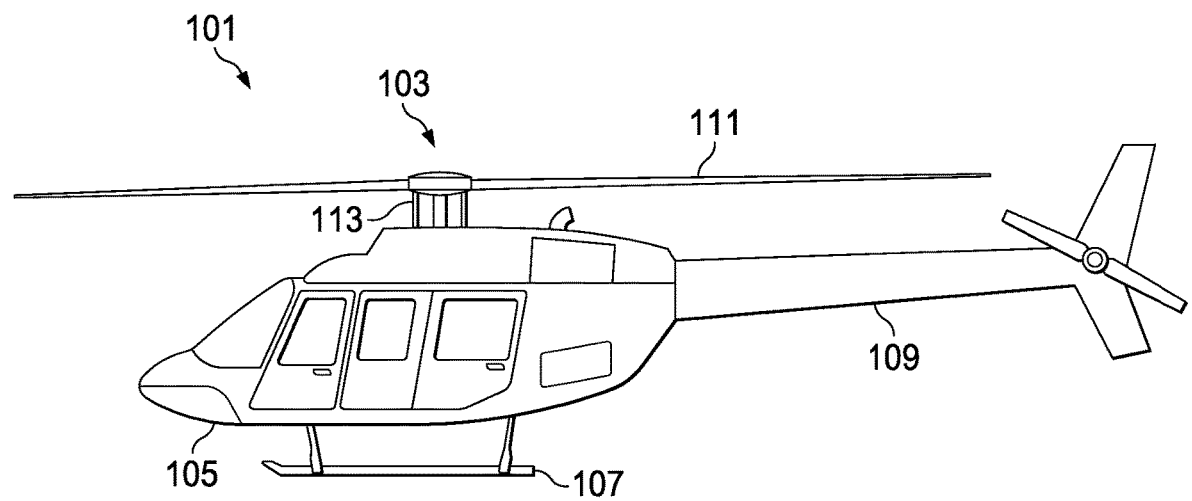
FIG. 1 is a side view of a rotorcraft, according to an example embodiment.

Referring to FIG. 1 in the drawings, a rotorcraft 101 is illustrated. Rotorcraft 101 has a rotor system 103 with a plurality of rotor blades 111. The pitch of each rotor blade 111 can be selectively controlled in order to selectively control direction, thrust, and lift of rotorcraft 101. Rotorcraft 101 further includes a fuselage 105, landing gear 107, and a tail member 109.

Figure 2:
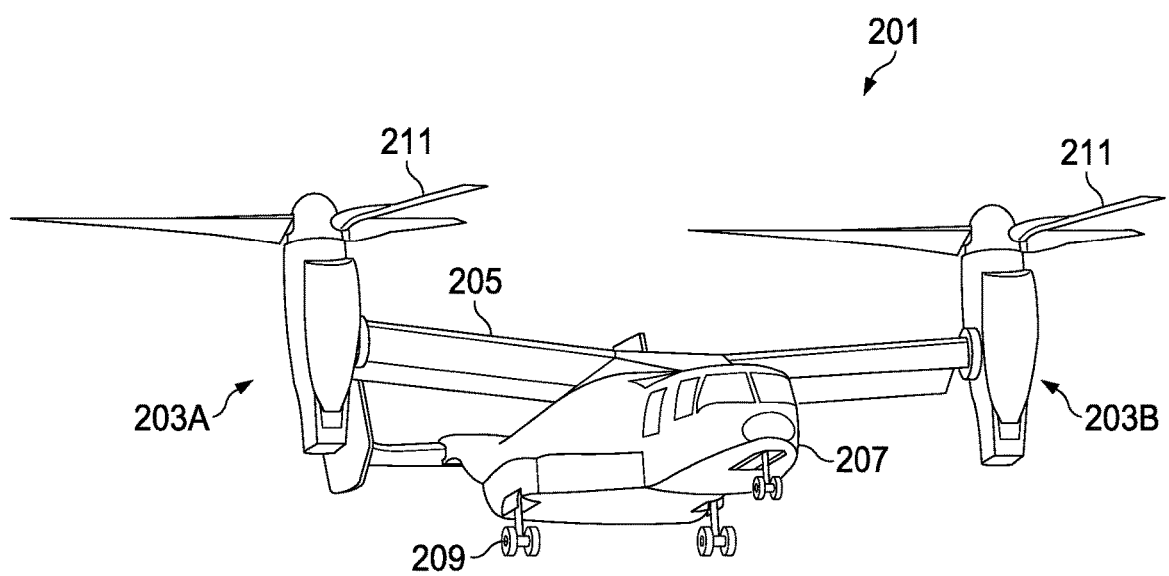
FIG. 2 is a perspective view of a tilt-rotor aircraft, according to an example embodiment.

Referring to FIG. 2 in the drawings, a tilt-rotor aircraft 201 is illustrated. Tilt-rotor aircraft 201 includes a fuselage 207, a landing gear 209, a wing 205, and rotatable nacelles 203A and 203B. Each nacelle 203A and 203B includes a plurality of rotor blades 211. The position of nacelles 203A and 203B, as well as the pitch of rotor blades 211, can be selectively controlled in order to selectively control direction, thrust, and lift of tilt-rotor aircraft 201.

Figure 3:
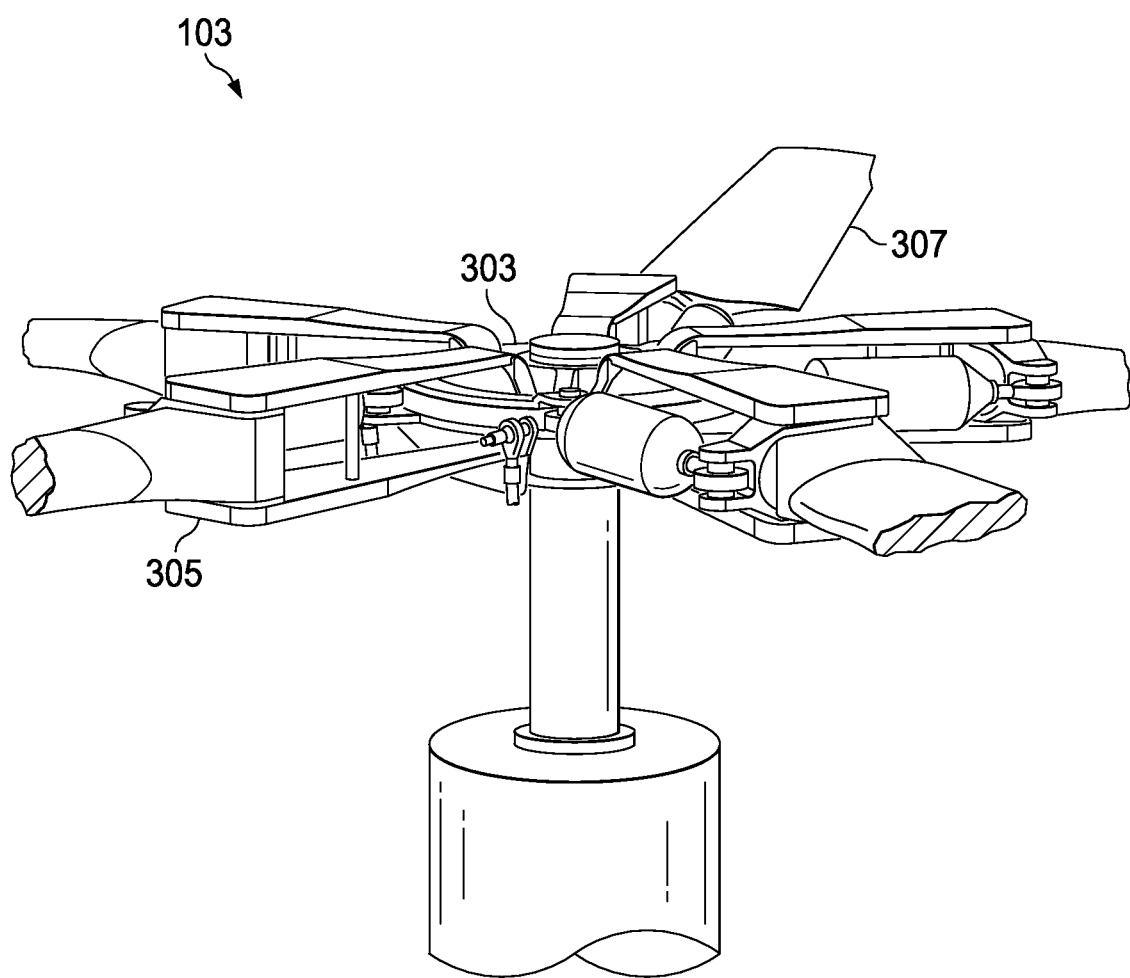
FIG. 3 is a perspective view of a rotor system, according to an example embodiment.

Referring to FIG. 3 in the drawings, a rotor system, rotor system 103, is illustrated. Rotor system 103 can include yoke 303, grips 305, and blades 307. In some examples, rotor system 103 may include more or fewer components. For example, rotor system 103 can further include components such as a gearbox, a swashplate, drive links, drive levers, and other components that may be incorporated.

It is especially desirable for components of rotorcraft 101 and tilt-rotor aircraft 201 to be manufactured with composite systems since composite components are typically very weight efficient. Illustrative composite components can include: wings, blades, such as blades 307, spars, rotor grips, such as grips 305, rotor yokes, such as yoke 303, compartments, and flooring, to name a few.

Figure 4:
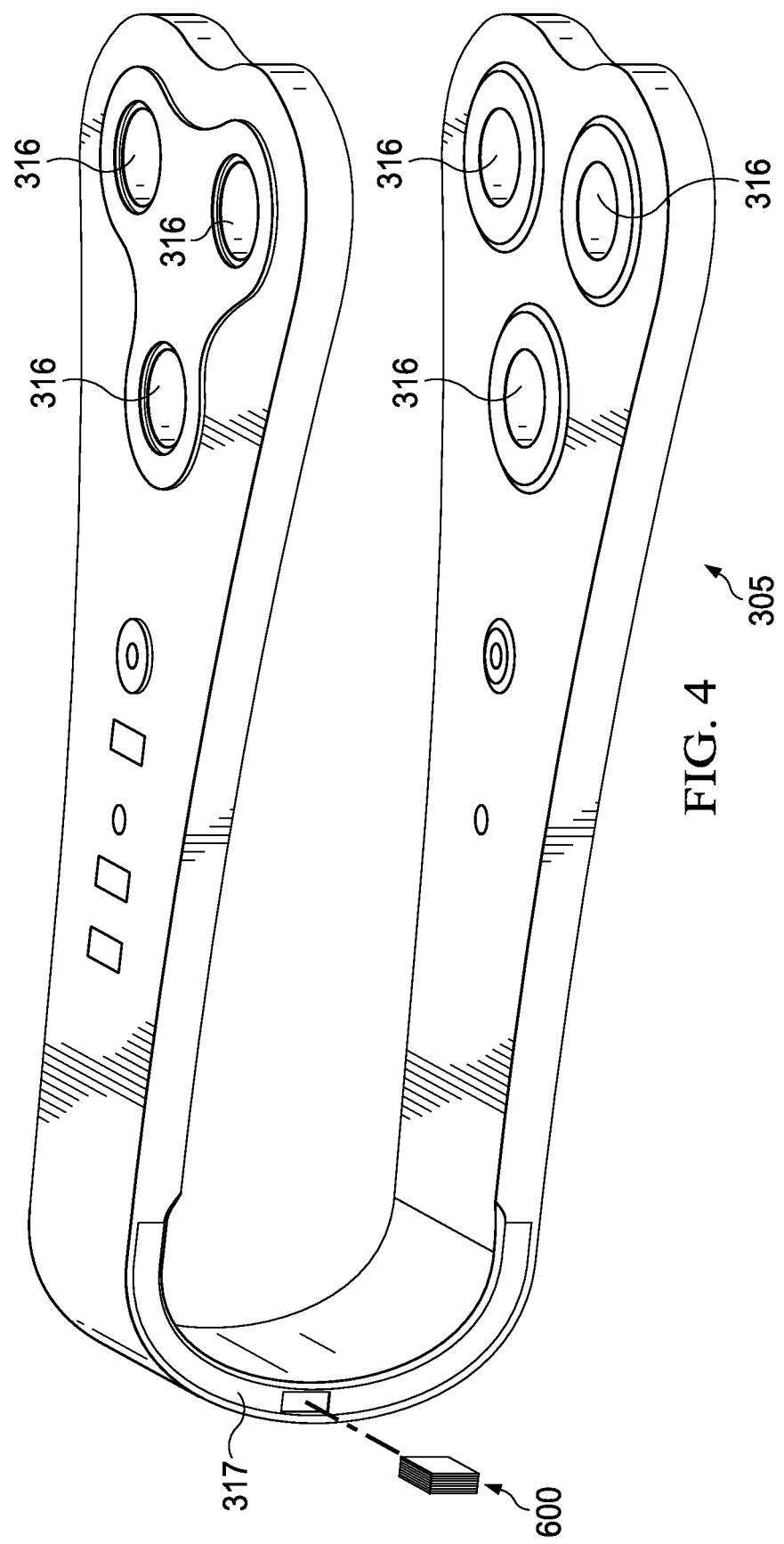
FIG. 4 is a perspective view of a grip of a rotor system, according to an example embodiment.

Conventionally, a composite component, such as grip 305 in FIG. 4, can be manufactured out of a composite laminate by assembling multiple layers of fibrous material in a homogenous polymeric-matrix material. Typical fibers used in the layers of fibrous composite usually include glass, carbon, aramid, or basalt. Typical polymer used in the polymeric matrix is usually an epoxy resin, vinylester, polyester thermosetting plastic, or phenol formaldehyde resin. The fibrous material may consist of particles, whiskers, fibers, or fabrics.

A rigid structure can be used to establish the desired shape of the composite component. Parts can be "laid up" on a rigid structure such as a caul plate, a mandrel, a mold, or a tool. The molding process can begin by placing the fibers on the rigid structure. The layup sequence or fiber orientation codes can vary. For example, one fiber orientation may be 0°/90°/+45°/−45°, another fiber orientation can be 0°/90°/90°/0°.

The fibers can be either dry or fibers that already contain a measured amount of polymeric matrix ("prepreg"). Dry fibers can be wetted with the polymeric matrix either by hand or by injecting the polymeric matrix into a closed mold. The fibers can be tape, tow, yarn, or fabric. Fiber fabric can be weaved; different types of weaves can be a plain weave, an eight harness satin weave, or unidirectional. The composite component can then be cured, leaving the fibers and the polymeric-matrix material in the shape created by the rigid structure. Heat and/or pressure can be used to cure the polymeric matrix. Once cured, the component may then be machined to its final shape.

Figure 5:
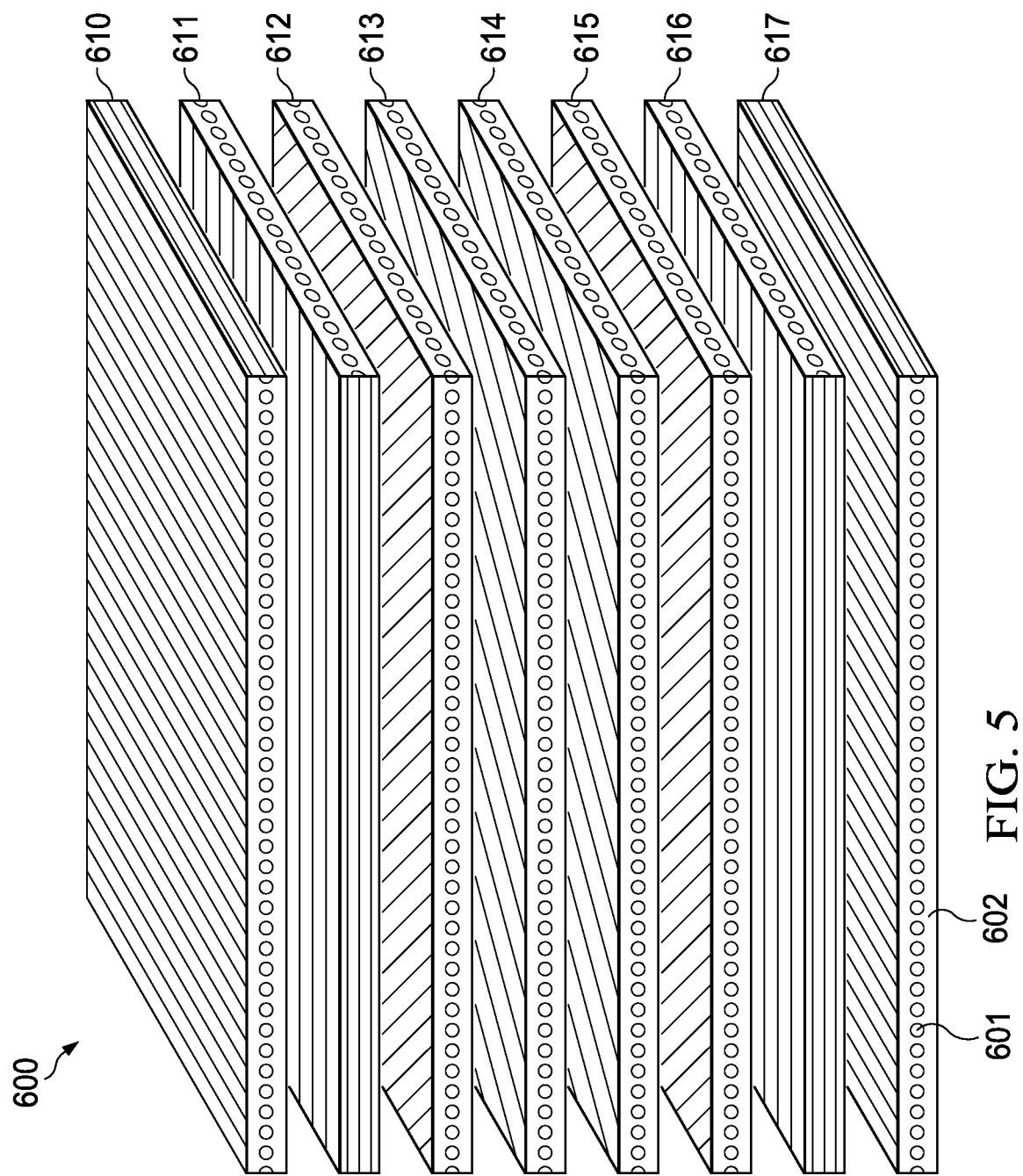
FIG. 5 is an exploded, perspective, section view of a composite laminate portion of a composite component, according to an example embodiment.
Figure 6:
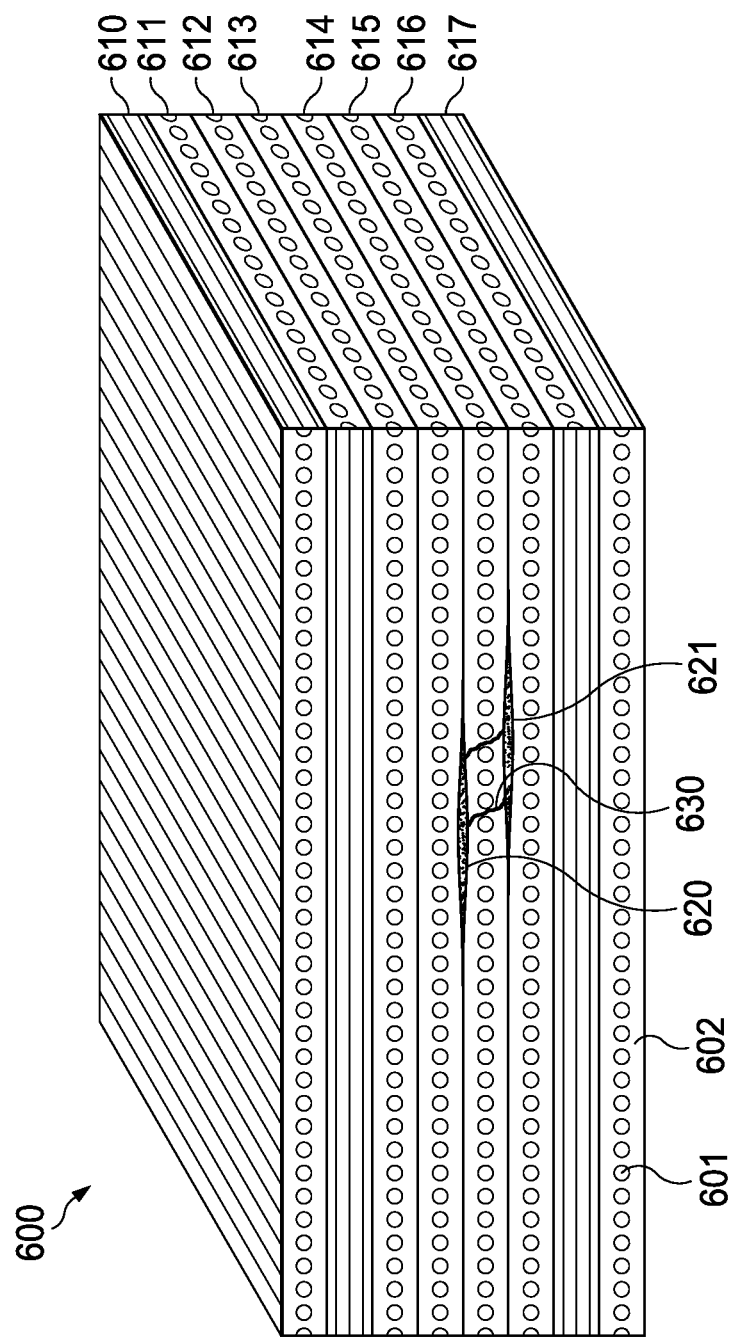
FIG. 6 is a perspective, section view of the composite laminate portion of FIG. 5, according to an example embodiment.

Manufacturing a component out of a fibrous material in a homogenous polymeric-matrix material can have many benefits, such as producing a composite component that provides strength, stiffness, and is lightweight. However, a composite component may be susceptible to crack initiation, delamination, or initiating a crack in one layer that may propagate to other layers of the composite, causing further delamination. For example, FIGS. 5 and 6 show a laminate portion of a composite component, portion 600, that can represent a laminate portion that was manufactured using conventional methods. Portion 600 can be manufactured out of a plurality of unidirectional prepreg tape layers, composite layers 610-617. As best seen in FIG. 6, delamination 620 occurred between layers 613 and 614. In some instances, delamination can propagate to other layers, via matrix cracks. In other instances, a matrix crack can propagate and cause delamination. Matrix cracks are cracks that occur in the polymeric-matrix material 602, between the fibers 601 in the fibrous material. In the example of FIG. 6, delamination 620 propagated, via matrix cracks 630, to cause delamination 621 between layers 614 and 615. In some examples, the initiation of matrix cracks and delamination is a local failure.

Because a composite component that was manufactured from a fibrous material in a homogenous polymeric-matrix material may have the disadvantage of crack initiation and propagation, a new method of manufacturing a composite component is needed.

Embodiments of the current disclosure recognize that the initiation of delamination and/or propagation of delamination may be impeded by the use of one or more "compliant" layers between a plurality of "baseline" layers. Compliant layers are layers that are stronger than baseline layers. Because matrix cracks and delamination can be a local failure, and may not always extend throughout the whole composite component, certain embodiments recognize that the local failure can be impeded by the selective placement of one or more compliant layers between a plurality of baseline layers in a minimal amount of layers of the composite component.

There can be several ways to achieve a compliant layer that is stronger than the baseline layers In one example embodiment, the compliant layer and the baseline layers are manufactured out of the same fibrous material, but each incorporate a different polymeric, matrix material. The polymeric-matrices of the compliant layer and the baseline layers may be different because the compliant layer's polymeric-matrix has a different chemical composition than the baseline layer's polymeric matrix. For example, the chemical composition of the compliant layer's polymeric-matrix material may include less hardener than the baseline layer's polymeric-matrix material. In another example, the chemical composition of the compliant layer's polymeric-matrix material may include more elastomer than the baseline layer's polymeric-matrix material.

In another example embodiment, the fibrous material of the compliant layer may be different from the baseline layers, whereas the polymeric-matrix material is the same in both the baseline layers and the compliant layer. In yet another example embodiment, both the fibrous materials and the polymeric-matrix materials are both different in the baseline layers, compared to the compliant layer.

One way of determining whether the resulting combination of fibrous material and the polymeric-matrix material of the compliant layer is stronger than the baseline layers can be to compare the in-plane shear characteristics of the compliant layer to the baseline layers. Another way of determining whether the resulting combination of fibrous material and the polymeric-matrix material of the compliant layer is stronger than the baseline layers can be to compare the tensile strengths of the compliant layer to the baseline layers. Additionally, the strength of the resulting fibrous material and polymeric-matrix material combination can be determined by either analysis or testing.

For example, a composite component, such as grip 305, may be conventionally manufactured from a high performance, polyacrylonitrile-based carbon fiber, such as HEXTOW® IM7, and an amine cured, toughened epoxy resin system, such as HEXPLY® 8552 Epoxy Matrix. This combination of HEXTOW® IM7 carbon fiber and HEXPLY® 8552 may result in a zero-degree tensile strength of three-hundred and ninety-five thousand pounds per square inch (psi); and a ninety-degree tensile strength of nine-thousand and sixty psi. This conventionally used fibrous material and polymeric matrix may represent baseline layers. Any combination of a different fibrous material and/or polymeric matrix that results in a higher tensile strength of the layers may represent a compliant layer. In this example, any combination of fibrous material and/or polymeric matrix that results in a tensile strength of over two-hundred and fifty-thousand psi may represent a compliant layer. Therefore, in this example, HEXPLY® 8552 epoxy may be used with HEXTOW® IM7 carbon fiber for the baseline layers, and a different epoxy that results in a higher tensile strength when used with HEXTOW® IM7 carbon fiber, may be used for a compliant layer.

Once an appropriate fibrous material and polymeric matrix is chosen for the compliant layer, the compliant layer can be selectively placed within the composite component at a location where peak interlaminar stresses occur that may otherwise be prone to delamination. One way of determining the location of where peak, interlaminar stresses occur in a composite component is through analysis, supported by testing. In one example, it may be beneficial to place the compliant layer such that the fibers of the compliant layer runs parallel to the primary load path. In another example, it may be beneficial to place the compliant layer such that the fibers of the compliant layer runs perpendicular to the primary load path.

In the example of grip 305, peak interlaminar stresses can occur at the root end 317 of grip 305. Therefore, it may be beneficial to place a compliant layer at the root end 317 of grip 305, as can be seen in FIG. 4. Other sections of grip 305 may also benefit from the selective placement of one or more compliant layers. For example, the composite portions surrounding bolt-holes 316 can experience peak interlaminar stresses and may benefit from selective placement of one or more compliant layers.

Figure 7:
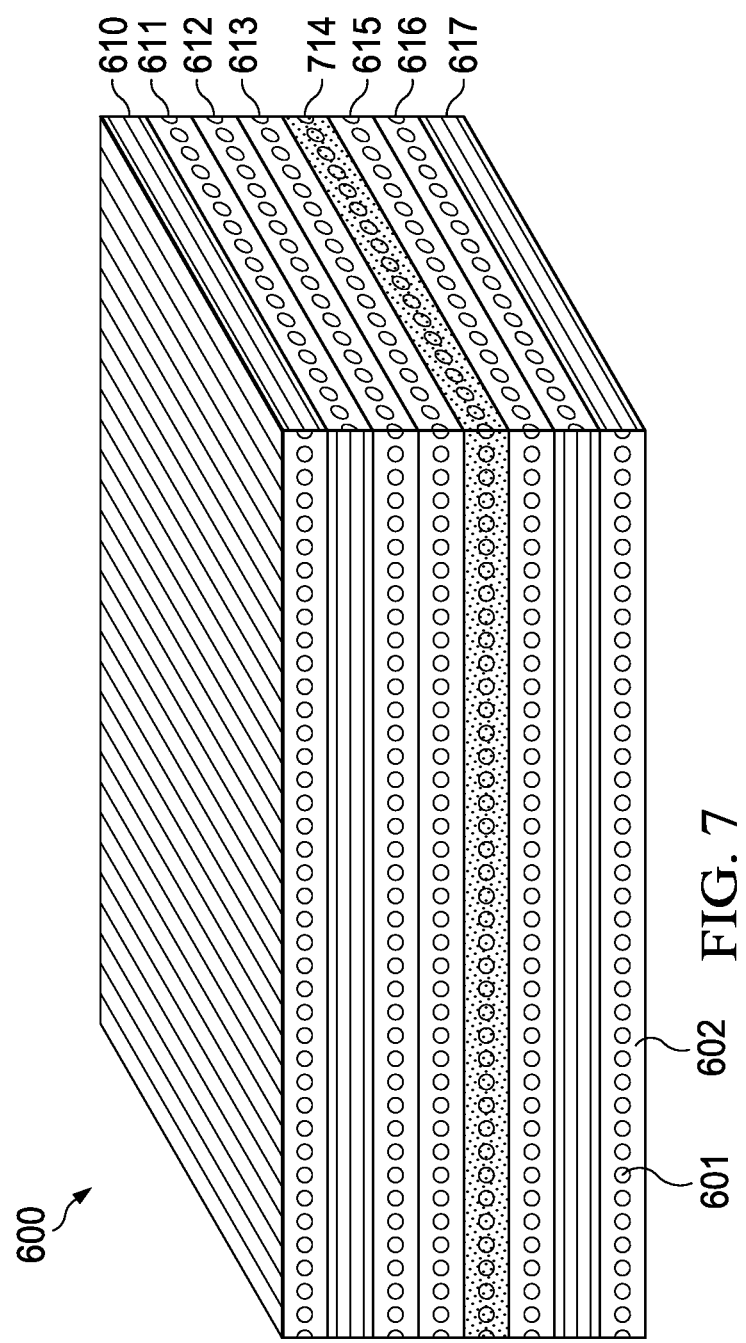
FIG. 7 is a perspective, section view of a composite laminate portion of a composite component, according to an example embodiment.

FIG. 7 shows one example embodiment of the selective placement of a compliant layer in a portion 600 of a composite component, such as grip 305. If baseline layer 614 (shown in FIG. 6) is at risk of becoming delaminated from at least one of layer 613 or 615, baseline layer 614 can be replaced with a stronger layer, compliant layer 714. In one example, compliant layer 714 may replace baseline layer 614 only in portion 600 of a composite component, such as grip 305. In another example, compliant layer 714 replaces baseline layer 614 throughout the composite component such that the compliant layer 714 has a planar dimension that is substantially equal to a planar dimension of the composite component, such as grip 305.

Figure 8:
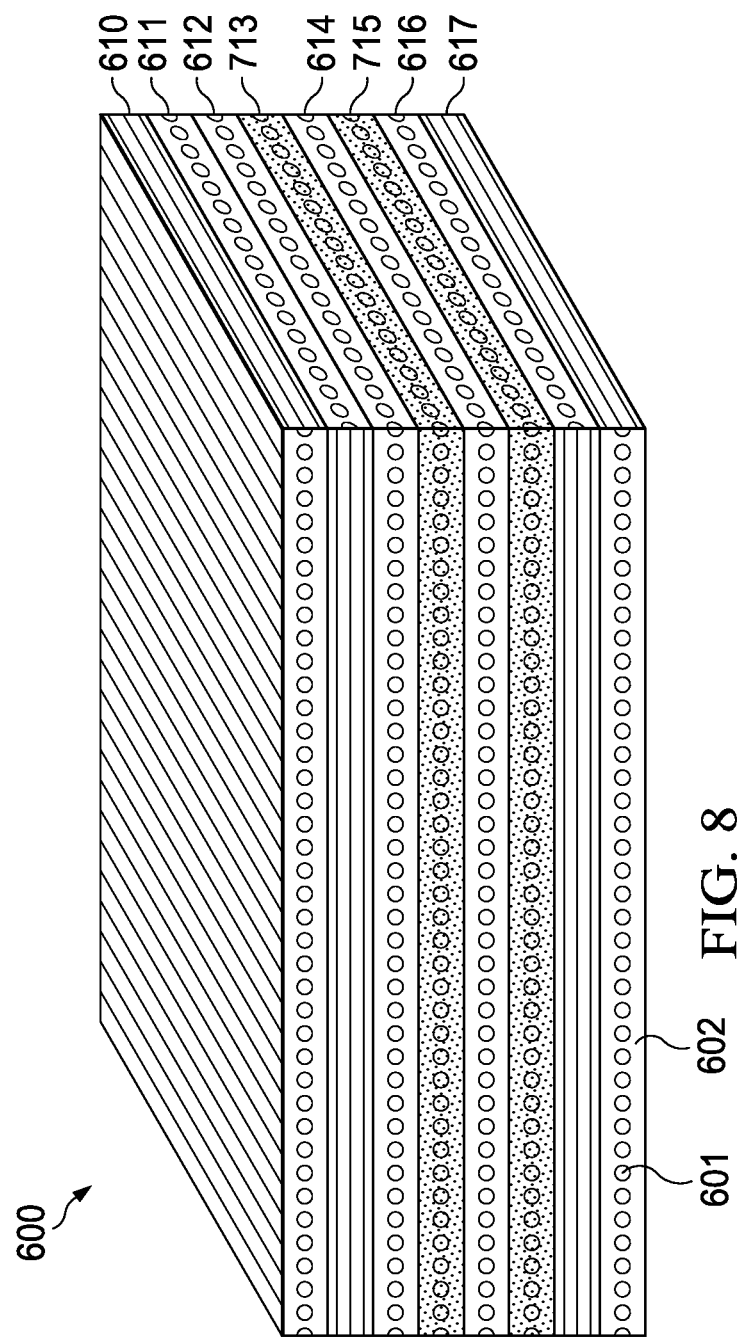
FIG. 8 is a perspective, section view of a composite laminate portion of a composite component, according to an example embodiment.

FIG. 8 shows another example embodiment of the selective placement of compliant layers in a portion 600 of a composite component, such as grip 305. In this example, compliant layers 713 and 715 can encompass baseline layer 614, replacing baseline layers 613 and 615 (shown in FIG. 6), if baseline layer 614 is at risk from being delaminated from either baseline layer 613 or 615. In one example, compliant layers 713 and 715 may replace baseline layers 613 and 615, respectively, only in portion 600 of a composite component, such as grip 305. In another example, compliant layers 713 and 715 replace baseline layer 613 and 615 throughout the composite component such that the compliant layers 714 and 715 each has a planar dimension that is substantially equal to a planar dimension of the composite component, such as grip 305.

Figure 9:
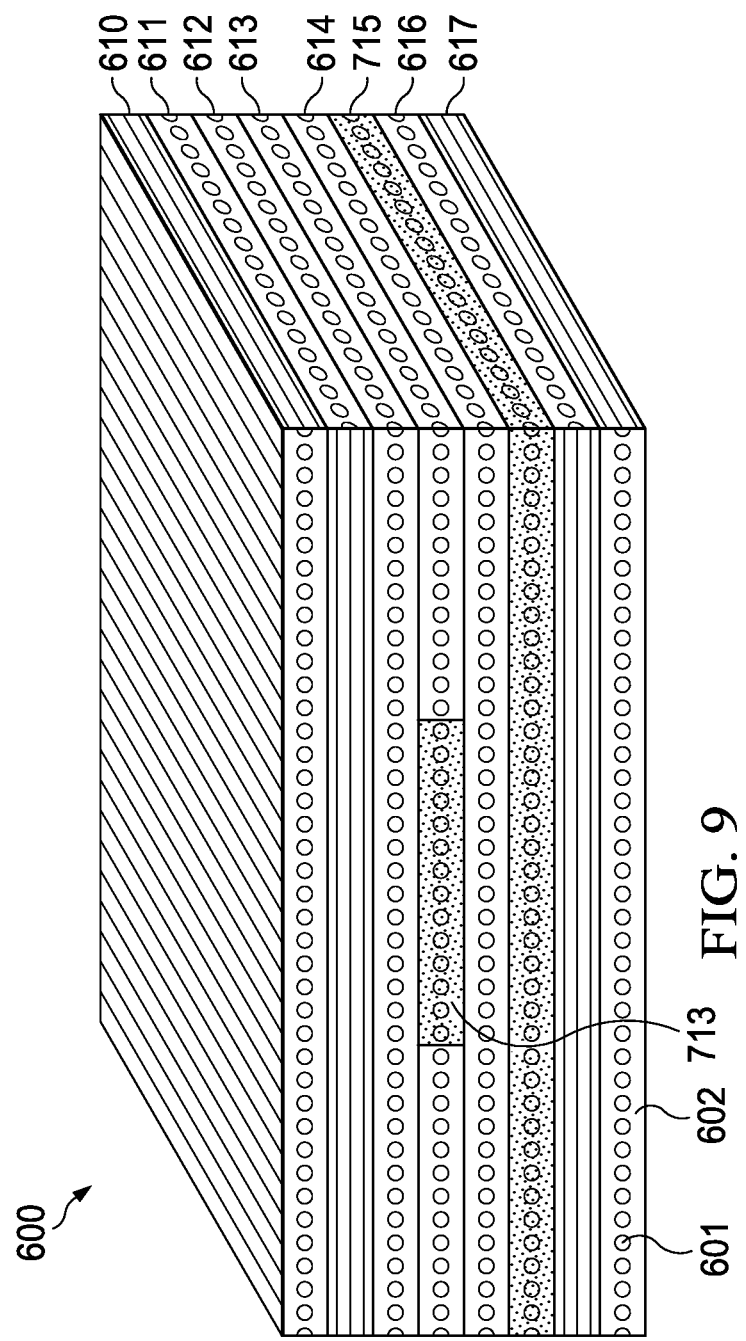
FIG. 9 is a perspective, section view of a composite laminate portion of a composite component, according to an example embodiment.

FIG. 9 shows yet another example embodiment of the selective placement of compliant layers in a portion 600 of a composite component, such as grip 305. In this example, compliant layer 713 can encompass a smaller section of baseline layer 614 than compliant layer 715, if baseline layer 614 is at risk from being delaminated from either baseline layer 613 or 615. In this example, compliant layer 713 replaces less of baseline layer 613, than compliant layer 715 replaces baseline layer 615. In one example, compliant layer 715 may replace baseline layer 615 only in portion 600 of a composite component, such as grip 305. In another example, compliant layer 715 replaces baseline layer 615 throughout the composite component such that the compliant layer 715 has a planar dimension that is substantially equal to that of the composite component, such as grip 305.

Figure 10:
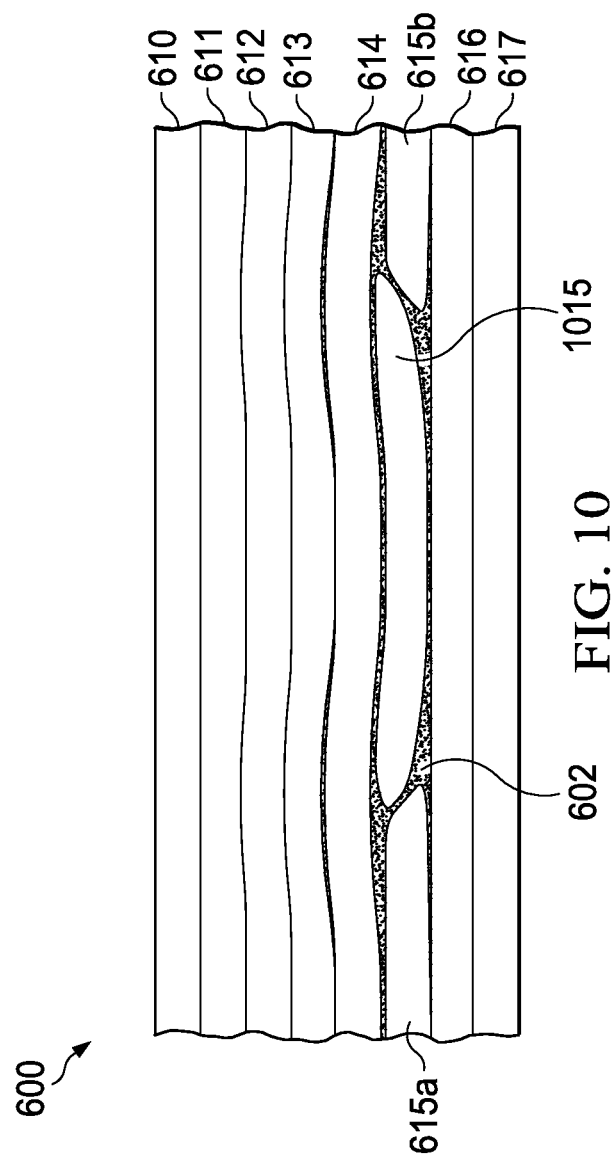
FIG. 10 is a section view of a composite laminate portion of a composite component, according to an example embodiment.

In the example of FIGS. 6 through 9, the compliant layers are shown to abut against the baseline layer. However, in some example embodiments, the compliant layers may overlap with the baseline layers. For example, FIG. 10 shows an exaggerated depiction of one embodiment where compliant layer 1015 overlaps with baseline layer 615. As can be seen, the end sections of compliant layer 1015 can overlap with the end sections of baseline layers 615a and 615b. The composite portion 600, as depicted in FIG. 10, may represent the layers prior to being subjected to vacuum.

The use of compliant layers has many potential benefits. First, the occurrence of matrix cracks may be reduced due to the increased strength of the layer. Second, the formation of delamination from matrix cracks may be retarded due to re-distribution of stresses in the compliant layers if matrix cracks occur. Third, the local placement of compliant layers may not compromise the characteristics of the composite component, such as structural stiffness, load carrying capability, or durability, because compliant layers replace only a small percentage of baseline layers. In some examples, compliant layers replace less than two percent of baseline layers. Fourth, the use of compliant layers may prolong the service life of a composite component. Fifth, compliant layers may be used without significantly increasing costs associated with re-design and re-tooling.

It should be appreciated that the apparatus and method of the present application may be utilized to manufacture composite components on other types of aircraft, as well as non-aircraft applications. For example, the apparatus and method of the present application may be utilized to manufacture composite components on a wind turbine, space vehicle, ground vehicle, surface marine vehicle, amphibious marine vehicle, unmanned aircraft, and submersible marine vehicle, to name a few examples.

The particular embodiments disclosed above are illustrative only, as the apparatus and method may be modified and practiced in different but equivalent manners apparent to those skilled in the art having the benefit of the teachings herein. Modifications, additions, or omissions may be made to the apparatuses and methods described herein without departing from the scope of the invention. The components of the apparatus and method may be integrated or separated.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. A composite component, comprising:
a composite laminate portion, comprising:
a plurality of baseline layers, each baseline layer having a plurality of carbon fibers disposed in a first polymeric matrix and an end section; and
a compliant layer having a plurality of basalt fibers disposed in a second polymeric matrix, wherein the compliant layer has a tensile strength greater than the baseline layer and the first polymeric matrix has a different chemical composition than the second polymeric matrix; the compliant layer includes an end section that overlaps an end section of a baseline layer.

2. The composite component of claim 1, wherein the compliant layer is placed within the composite component at a location where peak interlaminar stresses occur.

3. The composite component of claim 1, wherein the compliant layer has a planar dimension that is substantially the same as the planar dimension of the composite component.

4. The composite component of claim 1, wherein the tensile strength of the compliant layer is greater than two-hundred and fifty thousand pounds per square inch.

5. The composite component of claim 1, wherein the compliant layer is smaller than a baseline layer.

6. The composite component of claim 1, wherein the second polymeric matrix has more elastomer than the first polymeric matrix.

7. The composite component of claim 1, wherein the second polymeric matrix of the compliant layers is stronger than the first polymeric matrix of the baseline layers.

8. The composite component of claim 7, wherein the first polymeric matrix of the baseline layers is an amine cured, toughened epoxy resin system.

9. The composite component of claim 8, wherein the plurality of fibers of the baseline layers are unidirectional tape layers that are pre-impregnated with the amine cured, toughened epoxy resin system.

10. A composite component, comprising:
a composite laminate portion, comprising:
- a plurality of baseline layers, each baseline layer is a unidirectional carbon fiber tape layer disposed in a first polymeric matrix and an end section; and
- a compliant layer having a plurality of basalt fibers disposed in a second polymeric matrix and the first polymeric matrix has a different chemical composition than the second polymeric matrix, the compliant layer includes an end section that overlaps an end section of a baseline layer;
- wherein the compliant layer has a tensile strength greater than the baseline layer.

11. The composite component of claim 10, wherein the tensile strength of the compliant layer is greater than two-hundred and fifty thousand pounds per square inch.

12. The composite component of claim 10, wherein the compliant layer is smaller than a baseline layer.

13. The composite component of claim 10, wherein the second polymeric matrix has more elastomer than the first polymeric matrix.

* * * * *